United States Patent [19]

Briggs

[11] Patent Number: 4,506,781

[45] Date of Patent: Mar. 26, 1985

[54] SELF TRAINING BELT CONVEYOR WITH DIGGING ELEMENTS

[75] Inventor: Aubrey C. Briggs, Carnegie, Pa.

[73] Assignee: Dravo Corporation, Pittsburgh, Pa.

[21] Appl. No.: 501,836

[22] Filed: Jun. 7, 1983

[51] Int. Cl.³ .............................................. B65G 17/36
[52] U.S. Cl. ..................................... 198/711; 198/840
[58] Field of Search ............... 198/711, 844, 846, 847, 198/709, 713, 714, 840, 648, 509, 497, 701, 710, 699

[56] References Cited

U.S. PATENT DOCUMENTS

| | | | |
|---|---|---|---|
| 1,254,941 | 1/1918 | Snow | 198/840 |
| 1,498,845 | 6/1924 | Lakin | 198/844 |
| 2,227,776 | 1/1941 | Anderson | 198/497 |
| 2,405,378 | 8/1946 | Thomas | 198/711 |
| 2,881,904 | 4/1959 | Hoerth | 198/840 |
| 3,352,408 | 11/1967 | Thomson | 198/837 |
| 3,861,518 | 6/1975 | Dibben et al. | 198/711 |
| 3,910,404 | 10/1975 | Henrekson | 198/648 |
| 3,967,721 | 7/1976 | Rhoden | 198/844 |

FOREIGN PATENT DOCUMENTS

| | | | |
|---|---|---|---|
| 1030765 | 5/1958 | Fed. Rep. of Germany | 198/701 |
| 1112884 | 6/1956 | France | 198/837 |

Primary Examiner—Joseph E. Valenza
Assistant Examiner—Michael Stone
Attorney, Agent, or Firm—Parmelee, Miller, Welsh & Kratz

[57] ABSTRACT

An endless belt with bottomless buckets or other gripping elements bolted to its outer surface at spaced locations, has endless wire ropes each loosely received in a longitudinal bore formed in confronting faces of two rows of discrete blocks of resilient material bolted to the inner surface of the belt to form a continuous rail member. The wire ropes are firmly coupled to the endless belt as they pass around end pulleys together by the wedging action created as the tension in the endless belt pulls the associated two rows of discrete blocks which have tapered side walls down into peripheral grooves in the end pulleys which also have tapered, but slightly narrower side walls. With the belt firmly coupled to the wire ropes, radial digging forces tending to pull the belt away from the end pulleys, and lateral forces generated as the digger is advanced into a pile of bulk material on a bias which tends to cause the belt to creep laterally on the pulleys, are resisted by tension developed in the wire ropes. Seals prevent bulk material from getting between the endless belt or its resilient rail members and the end pulleys, and scrapers remove any such material which gets past the seals and deflects it laterally out of the belt loop.

21 Claims, 7 Drawing Figures

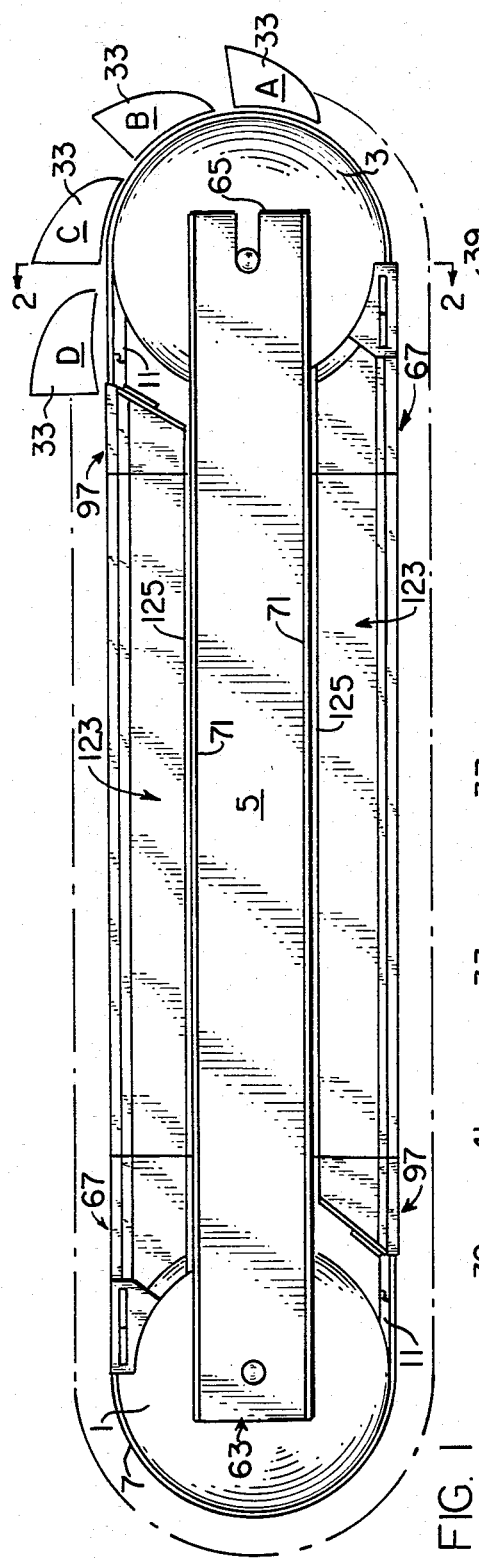
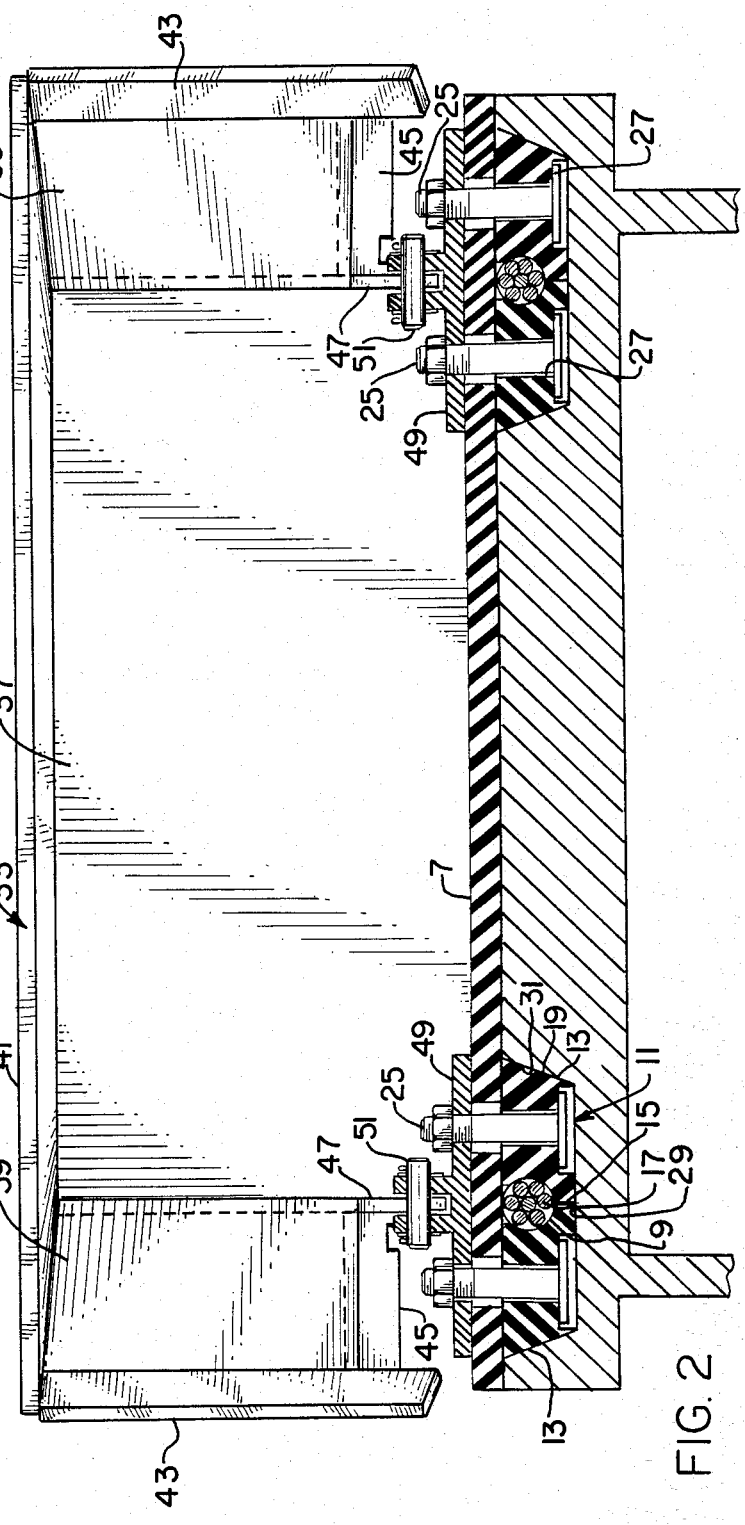

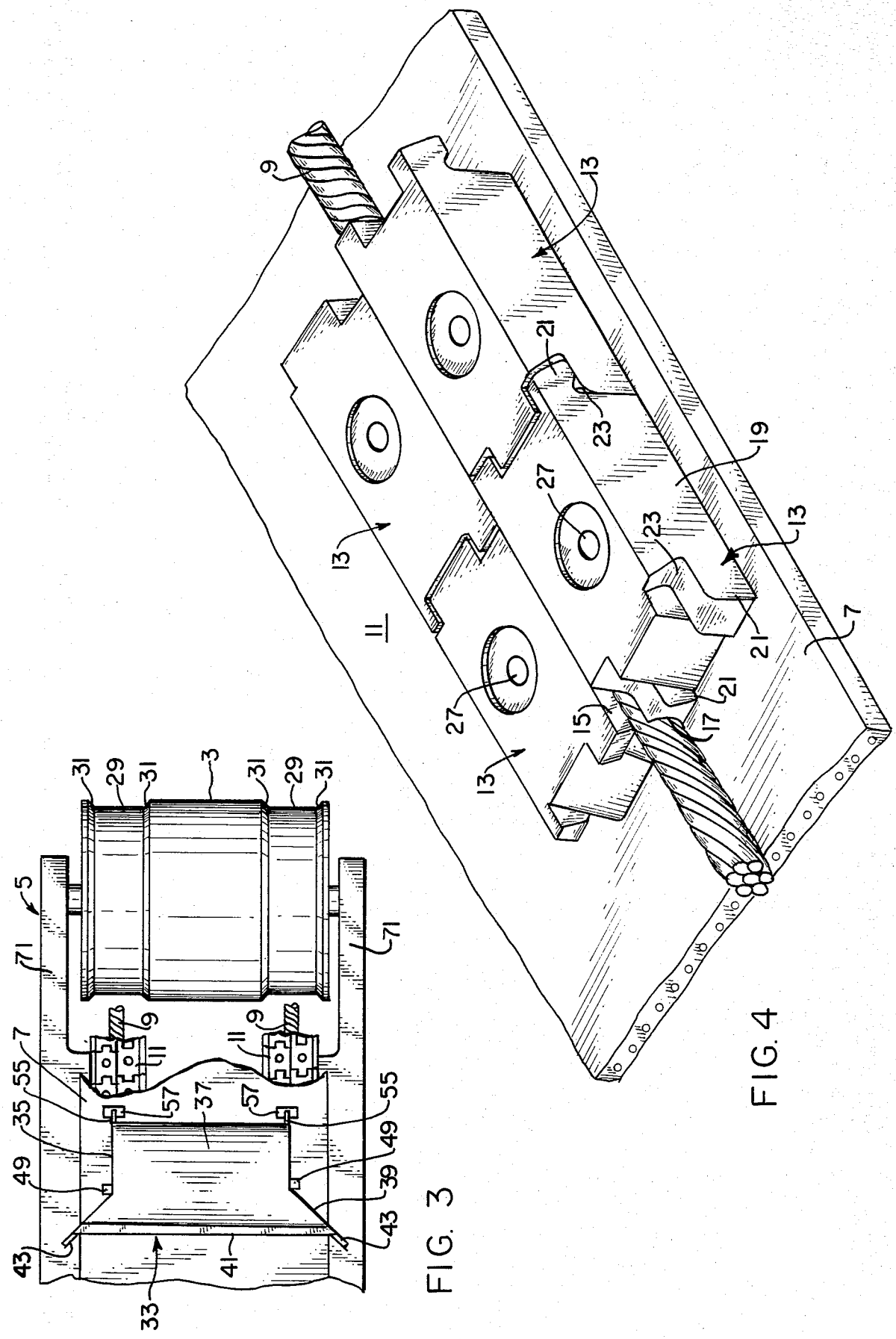

SELF TRAINING BELT CONVEYOR WITH DIGGING ELEMENTS

CROSS REFERENCE TO RELATED APPLICATION

My commonly assigned, concurrently filed application entitled "A Tethered Vehicle For Moving Bulk Material" which is identified by attorney docket No. 83072.

BACKGROUND OF THE INVENTION

1. Field of the Invention

This invention relates to belt conveyors and especially to belt conveyors having digging means on the outer surface thereof which impose radial, longitudinal, and lateral loads on the belt as it passes around the end pulleys and also in some applications on the straight length between pulleys.

2. Prior Art

Conveyors in the form of bucket ladders are commonly used in lifting bulk materials and are often used as diggers which are advanced into or across a pile or storage chamber to reclaim such material. Typically, such conveyors comprise a series of buckets which are secured at spaced intervals along endless chains which are constrained to a loop by sprocket wheels. The teeth of the sprocket wheels resist any side loads imposed on the buckets as the conveyor advances into the material at an angle to its longitudinal axis. Tension in the chains or the weight thereof, depending upon the arrangement, resists the tendency of the digging forces to lift the chains off of the sprockets.

Chain type bucket ladders are very heavy and cumbersome, however, and require very substantial supporting structures. This is a particular problem in reclaimers used to recover material from very large piles and in continuous ship unloaders where the bucket ladder is mounted on the end of a very long boom. In addition, chain type bucket ladders operate at relatively slow speeds.

A belt type conveyor fitted with buckets is much lighter and less cumbersome than a chain type bucket ladder, however, as is well known, belts tend to creep axially along end pulleys even when no intentional side loads are imposed on the conveyor. Where such a conveyor is fed into a pile with a component of motion lateral to the plane of the belt loop, very significant side loads are generated which must be resisted. In addition, at the digging end, the radially outward digging force tends to pull the belt away from the end pulley causing rapid deterioration of the belt.

As will be discussed in detail, the present invention employs one or more separate and independent wire ropes inside the loop of the endless belt as part of an arrangement to resist these radial and lateral forces. Wire ropes, of course, have been imbedded in conveyor belts to increase their tensile strength which aids in resisting the radial digging forces but this in itself does nothing to resist the lateral forces. Separate wire ropes have also been used inside the loops of endless belts to sustain the tensile load. In a great many of these, as exemplified for instance, by U.S. Pat. No. 2,751,065, the belt is frictionally supported on wire ropes on the level or on relatively shallow angled work runs, but is separated from the wire ropes at the end of the work run and goes around its own end pulley while the wire ropes are reeved through a separate arrangement of pulleys which applies driving tension to them. U.S. Pat. No. 2,747,726 discloses a belt conveyor in which wire ropes which separate from the belt at the end pulleys are mechanically gripped on the work and return runs by clamps attached to the belt. The conveyor in U.S. Pat. No. 3,388,786 comprises a series of rigid plates which slide with respect to one another and resilient linkages between plates which accommodate for changes in plate pitch at the end pulleys. The plates have curved bottoms conforming to the curvature of the end pulleys to facilitate cleaning of the plates as they travel around the end pulleys. The wire ropes on which the plates are supported on the work and return run are diverted around separate end pulleys.

In one prior art arrangement, a wire rope is coupled to the vertical portion of a belt type conveyor with integral pockets for holding bulk material by two rows of resilient blocks secured to the inside of the belt. The wire rope is forced into half round grooves in confronting faces of the blocks by a pulley at the beginning of the vertical run and is gripped tightly by pairs of pulleys spaced along the vertical run which urge the blocks toward each other with the wire rope inbetween. At the top of the vertical run, the blocks are received in a square cut peripheral groove in the deflection pulley and the wire rope is pulled out from between the resilient blocks as the belt, with the blocks attached, is deflected 90° from the vertical to the horizontal while the wire rope continues 180° around the pulley and proceeds vertically downward.

In these prior art arrangements, the wire rope is used to carry at least some of the tension forces imposed on the belt on the work run. The wire rope is either separated physically from the belt at the end pulleys or is otherwise decoupled from the belt in this area.

It is an object of the present invention to provide a rugged, light weight, high speed belt conveyor fitted with buckets or other digging means which can dig bulk material under conditions which impose high radial and/or lateral forces on the conveyor belt.

It is a more specific object of the invention to achieve the above objective using one or more wire ropes which are coupled to the conveyor belt only at the end pulleys.

SUMMARY OF THE INVENTION

The above objectives and others are achieved by a belt conveyor having one or more endless wire ropes extending throughout their length inside the loop of an endless belt. A resilient rail member associated with each wire rope is secured to the inner surface of the belt and is provided with a longitudinal bore in which the associated wire rope is loosely received. The resilient rail members can be made of two longitudinal halves and preferably each of these is composed of a series of discrete resilient blocks. The side edges of each resilient rail member are tapered inward toward each other from the inner surface of the belt inward and the end pulleys are provided with peripheral grooves of corresponding cross-section, including tapered side walls, but of slightly narrower width, in which the resilient rail members are received as the endless belt, endless wire ropes and resilient rail members pass around the end pulleys together. Since the pulley grooves are slightly narrower in width than the resilient rail members, the tension in the belt produces a radial component which forces each resilient rail member down into the corresponding pulley groove thereby wedging it into gripping engagement with the associated wire rope. Lateral forces imposed on the belt, such as by moving the conveyor laterally into a pile of bulk material, stretch the wire ropes due to the tendency of the tapered side walls on the resilient rail members to climb out of the pulley grooves. The resulting tension induced in the wire ropes resists the lateral force tending to cause the belt to creep longitudinally along the pulley. Similarly, the digging force which tends to pull the belt radially away from the end pulley is resisted by the tension it induces in the wire ropes. While the radial digging force tends to relieve the wedging action produced by tension in the endless belt, the resiliency of the resilient rail members and the other parameters are such that sufficient gripping force remains to maintain the coupling of the wire ropes to the endless belt as they pass around the end pulley together. It is also possible to bias the wire ropes with a tension force which will wedge the resilient rail members down into the pulley grooves.

Significantly, the wire ropes are only coupled firmly to the conveyor belt at the end pulleys where they are needed to resist radial and lateral forces on the belt. Between the end pulleys, the wire ropes are loosely connected to the endless belt. Thus, in the work runs, essentially the full tension load is carried by the belt, not the wire ropes. This is advantageous because the endless belt and wire ropes, are then free to adjust longitudinally with respect to each other in this area.

The outer surface of the endless belt is provided with digging means, preferably discrete digging members such as, for example, cleats or buckets. These discrete digging members are secured to the belt by elongated fasteners which also secure the discrete blocks of the resilient rail members to the belt. In the case of buckets, one end is secured to the belt by means which permit longitudinal adjustment to accommodate for the change in straight line distance between the securing points on the belt as the belt and buckets pass around the end pulleys. This means may take the form of a linkage pivotal in the plane of the belt loop.

The present invention is useful in any conveyor subjected to lateral and/or radial loading and is particularly useful in belt type bucket ladders where the conveyor is advanced in a direction which has a lateral component. It is also particularly useful in the cleated tracks for the tethered vehicle for moving bulk material which is disclosed in the above-identified related application. Furthermore, the buckets are provided with back and side walls but no bottom wall. Instead, the endless belt serves as the bottom of the bucket. This eliminates wear on the belt caused by material lodging between a rigid bucket bottom wall and the belt, and also, due to the flexing of the belt as it bends around the end pulleys, prevents material from caking in the buckets which would reduce the capacity of the conveyor and increase the power required.

It is important to the life of the endless belt that the bulk material and other foreign matter be prevented from getting between the pulleys and the belt or its resilient rail members. Accordingly, seals are provided which block the entry of bulk material between the belt, resilient rail members and pulley as the belt begins to wrap around the pulleys. The seals include scrapers which remove from the grooves any material which may have lodged therein and deflect it laterally outward as the belt leaves the pulley.

BRIEF DESCRIPTION OF THE DRAWINGS

FIG. 1 is a side elevation view of a conveyor constructed according to the teachings of the invention;

FIG. 2 is a vertical section taken through the conveyor of FIG. 1 along the line II—II;

FIG. 3 is a top plan view of a portion of the conveyor of claim 1 with parts broken away;

FIG. 4 is an isometric view illustrating the manner in which the wire rope is coupled to the endless belt of a conveyor in accordance with the teachings of this invention; and, FIG. 5 is an enlarged view of a portion of FIG. 1 with parts removed for clarity;

DESCRIPTION OF THE PREFERRED EMBODIMENT

Figure 5:
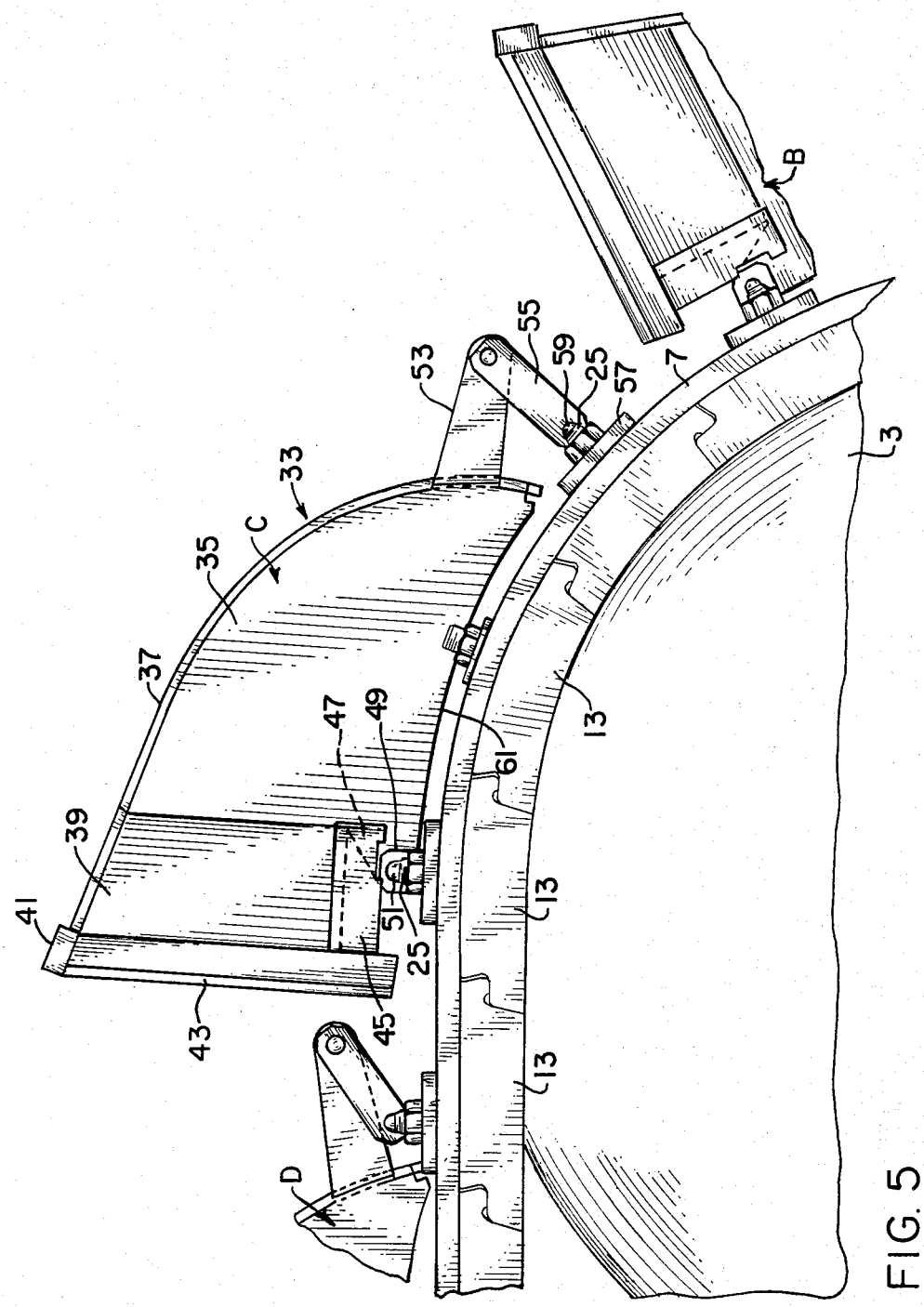

The drawings illustrate the application of the present invention to a digger for recovering bulk material. The unit includes a pair of end pulleys 1 and 3 supported in spaced relation by a frame 5. An endless conveyor belt 7 is trained around the pulleys and is driven by motive means (not shown) connected to one of the pulleys. A pair of endless wire ropes 9 extend around the inside of the loop of the endless belt 7 and are connected to the belt adjacent the longitudinal edges thereof by resilient rail members 11.

As best seen in FIGS. 2 and 4, the resilient rail members 11 are each made up of two rows of discrete blocks 13 of resilient material with each row forming a longitudinal half of the rail member. The blocks 13 are all identical and have a vertical side edge 15 with a longitudinal, semi-circular groove 17, and a tapered side edge 19. The blocks 13 in the two rows which make up each resilient rail member 11 are oriented opposite each other so that the vertical side edges 15 confront one another and the semi-circular grooves 17 form a circular bore in which the associated wire rope 9 is loosely received. The outer edges 19 of the composite rail member then taper inward toward each other from the inner surface of the belt 7 to give the rail member a trapezoidal cross-section. Opposite ends of each resilient block 13 are provided with complimentary projections 21 and recesses 23 which mesh with those on the adjacent blocks in the row to provide a flexible but essentially continuous rail member enclosing each wire rope. Each of the discrete blocks 13 is secured to the inner surface of the endless belt 7 by a bolt 25 seated in a countersunk transverse bore 27 in the block. While the wire ropes are thus loosely coupled to the endless belt by the discrete blocks 13, they are sufficiently retained to resist escape from between the two rows of engaging blocks under the action of a moderate force vertical to the face of the belt 7 such as would be imposed by a bucket cantilevered from a vertically oriented belt.

The end pulleys 1 and 3 of the digger are provided with peripheral grooves 29 in which the resilient rail members 11 are received as the endless belt 7, wire ropes 9 and rail members pass around the pulleys. The grooves 29 are of the same trapezoidal cross-section as the rail members 11, having tapered side walls 31, but are slightly narrower. Thus, while the wire ropes are only loosely coupled to the belt 7 on the work and return runs between the end pulleys, tension in the belt pulls the resilient rail members 11 down into the grooves 29 in the end pulleys. The wedging action thus generated by the side walls 19 of the discrete blocks 13 of the resilient rail member bearing against the tapered walls 31 of the grooves 29 compresses the discrete blocks in the two rows toward each other and into firm gripping engagement with the associated wire rope. Any lateral forces on the belt tending to cause it to creep axially along either of the pulleys 1 or 3 cause the resilient blocks to lift as the tapered side edges 19 of the blocks slide along the tapered side wall 31 of the groove 29. This produces tension in the wire rope which resists lateral movement.

As will be described in more detail below, the belt 7 is equipped with buckets 33 for lifting bulk material. Where the buckets dig into the material as they pass around one end pulley, very significant radial forces can be developed which tend to pull the belt away from the peripheral face of the pulley causing premature belt failure because of the sharp local bend in the belt and because the ingress of material between the belt and pulley may distress the belt. Without the present invention, these radial forces reduce the friction force between the belt and the pulley leaving the belt more prone to creep. However, by coupling the belt on which the buckets are mounted to the wire ropes 9, tension is developed in these ropes which resists the radial digging forces. As mentioned previously, the tension in the endless belt, the resiliency of the blocks 13, the relative width of the resilient rail members 11 and grooves 29 and their taper, and the relative lengths and elasticities of the belt and ropes are such that a firm grip is maintained by the resilient blocks on the wire ropes 9 despite the tendency of the radial digging forces to pull the resilient rail members out of the grooves 29.

The buckets 33 mounted on the belt 7 in a continuous series (only 4 are shown in FIG. 1), include side walls 35, a curved back wall 37 which flares outward at the mouth of the bucket, and side panels 39 which extend outward from the side walls under the flared portion of the back wall. Wear plates 41 and 43 are welded onto the top and side edges respectively of the mouth of the bucket to resist abrasion from digging into bulk material. Filler plates 45 close the gap below the side panels 39.

The buckets are secured to the conveyor belt 7 at the leading end by projections 47 on the side walls 35 which are pivotally connected to clevises 49 by pins 51. Each clevis 49 is bolted to the belt 7 by the bolts 25 which also secure the confronting discrete resilient blocks 13 in the adjacent rows of blocks making up the resilient rail member 11 on the associated side of the belt.

The trailing end of each bucket is also secured to the belt on each side but through a flexible connection which permits this end to reciprocate in the direction of belt movement relative to the fixed connection to the belt. To this end, a boss 53 on the rear of the side walls 35 is pivotally connected to one end of a link 55 which is pivotally connected at the other end to a clevis 57 by pin 59. Each clevis 57 is bolted to the belt 7 in the same manner as the clevises 49 by bolts 25 which also pass through discrete blocks 13 in the two rows of blocks making up the resilient rail member on that side of the belt.

The purpose of the mounting which includes the link 55 is to accommodate for the change in the straight line distance between the clevis pins 51 and 59 as the belt passes from the straight runs to the curved path around the end pulleys 1 and 3. As the belt 7 bends around the end pulleys, its length at the mean diameter of its curvature remains constant, but the straight line distance between any two points on the mean diameter becomes shorter because the chord is shorter than the curved path assumed by the belt. For objects secured to the surface of the belt, such as the clevises 49 and 57, the change in the straight line distance is dependent upon the radial distance of the pertinent point from the mean diameter of the belt. For two objects close to the belt surface, the straight line distance between them decreases as the belt curves around the pulleys. However, for objects farther removed from the belt surface, such as the clevis pins 51 and 59, this distance increases during passage around the pulleys. The affects of this are illustrated in FIGS. 1 and 5. As the buckets such as A, B and C, pass in a counterclockwise direction around the end pulley 3, and the section of the belt 7 between each pair of clevises 49 and 57 assumes the curvature of the pulley causing the straight line distance between the associated clevis pins 51 and 59 to increase, the links 55 pivot counterclockwise on the clevis pin 59 to accommodate for the rigid dimension of the side walls 35 of these buckets. As a bucket reaches the straight run between end pulleys, the links 55 rotate clockwise to the position shown for the bucket D in FIG. 1.

It should be noted that the buckets 55 have only side walls 35 and a back wall 37. The bottom wall is provided by the endless belt 7. This eliminates the problems associated with material becoming lodged between an integral bottom wall of a bucket and the endless belt which would subject the belt to undue wear, especially where, as in the preferred embodiment, the buckets move relative to the belt surface. There is another advantage to using the belt as the bottom wall of the buckets. Since the belt bends as it passes around the end pulleys, and the buckets move longitudinally, and to some extent radially, with respect to the belt surface, the tendency of sticky material to become lodged in the buckets is reduced. As seen in FIGS. 1 and 5, the bottom edges 61 of the side walls 35 of each bucket are concavely curved to be concentric with the periphery of the end pulleys to provide a relatively close fit as the bucket digs into bulk material. Even though this creates a gap between the side walls and the belt on the straight sections, it has been found that very little material is lost through such a gap.

Figure 6:
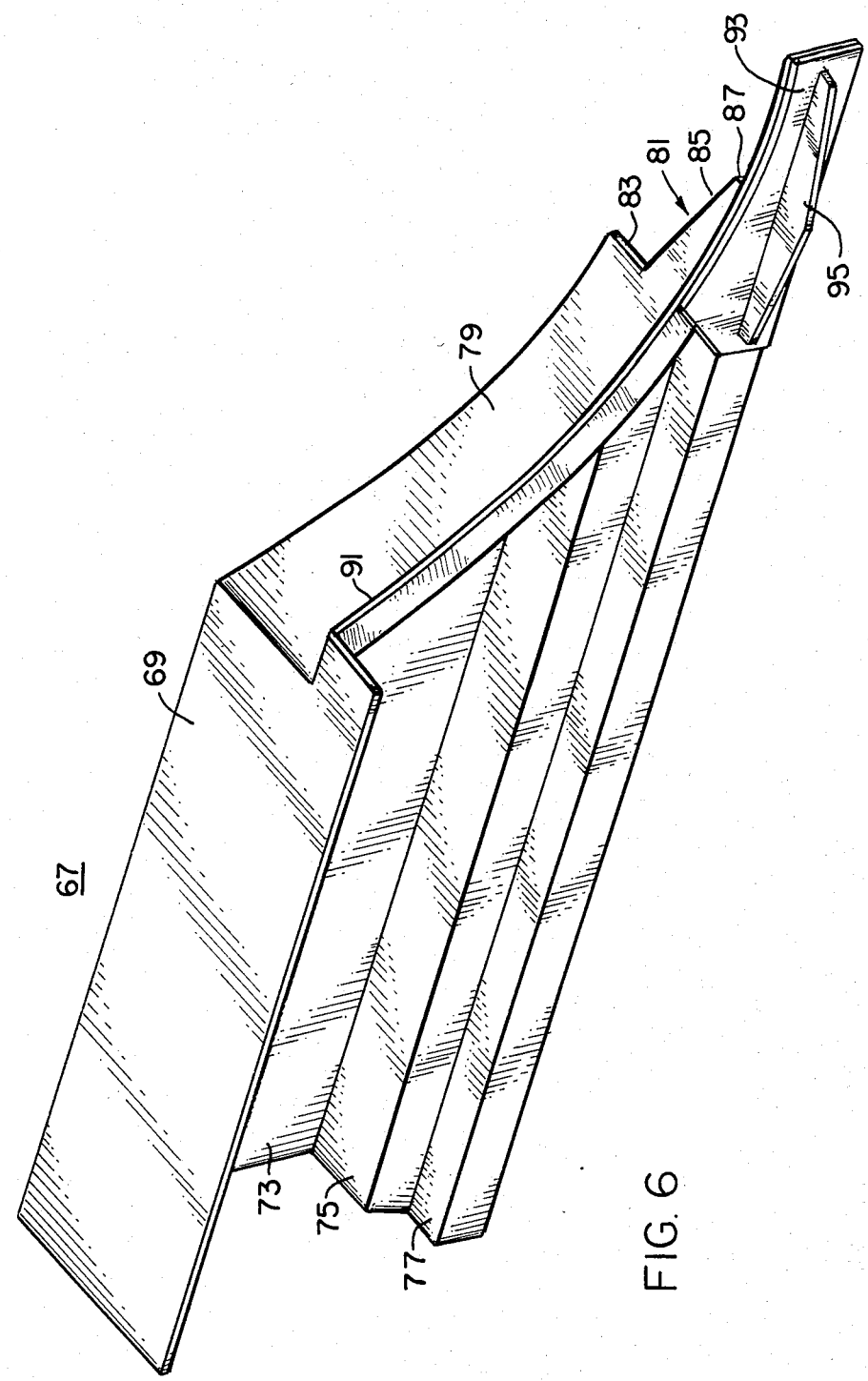
FIG. 6 is an isometric view of a section of a seal according to the invention used to prevent material from getting under the belt of the conveyor.

In order to prevent bulk material and other foreign objects from getting between the endless belt 7 or its resilient rail members 11 and the pulleys 1 and 3, seals are mounted on the frame 5. This frame includes elongated members in the form of I beams 63 which extend longitudinally along the sides of the endless belt with the end pulleys 1 and 3 journalled for rotation in the webs 65 thereof at each end. Where the endless belt 7 approaches an end pulley, a first seal unit 67 is provided. Such a seal is shown in the isometric drawing of FIG. 6 and includes a flange portion 69 which abuts the flange 71 of I beam 63. A planar member 73, recessed from the longitudinal edge of the endless belt, ettends at right angles from the flange portion 69 toward the resilient rail member on the associated side of the belt and terminates in a first offset portion 75 which extends laterally and then diagonally outward parallel to the bottom and side faces of the resilient rail member, followed by a second offset portion 77 which extends laterally outward parallel to the inner surface of the belt 7 outboard of the resilient rail member and then parallel to the longitudinal edge of the belt. These offset portions form, with the confronting surfaces of the resilient rail member and the endless belt with which they are in close proximity, a labyrinth seal which prevents bulk material from getting under the belt and rail members.

The planar member 73 and its offset portions 75 and 77 extend longitudinally to the points of intersection of the endless belt and rail member with the end pulley which they approach. A curved cover plate 79 mounted perpendicular to the planar member 73, covers the groove 29 in the pulley and the peripheral surface of the pulley outboard of the groove, and is provided with a notch 81 through which the resilient rail member passes to enter the groove in the pulley. The edge 83 of the cover 79 lies along the intersection of the bottom surface of the resilient rail member and the peripheral surface of the end pulley, the edge 85 lies along the tapered side 19 of the rail member and the edge 87 lies along the intersection of the inner surface of the endless belt and the peripheral surface of the end pulley.

An arcuate member 91 secured at right angles to the edge of curved cover plate 79 extends around the end of the end pulley from the flange 69 to about the point of tangency of the endless belt and the end pulley to prevent material from entering from the end of the pulley. A reinforcing plate 93 is secured to the arcuate member 91 at the distal end to strengthen it and a stiffener 95 is welded to this reinforcing plate for added rigidity.

Figure 7:
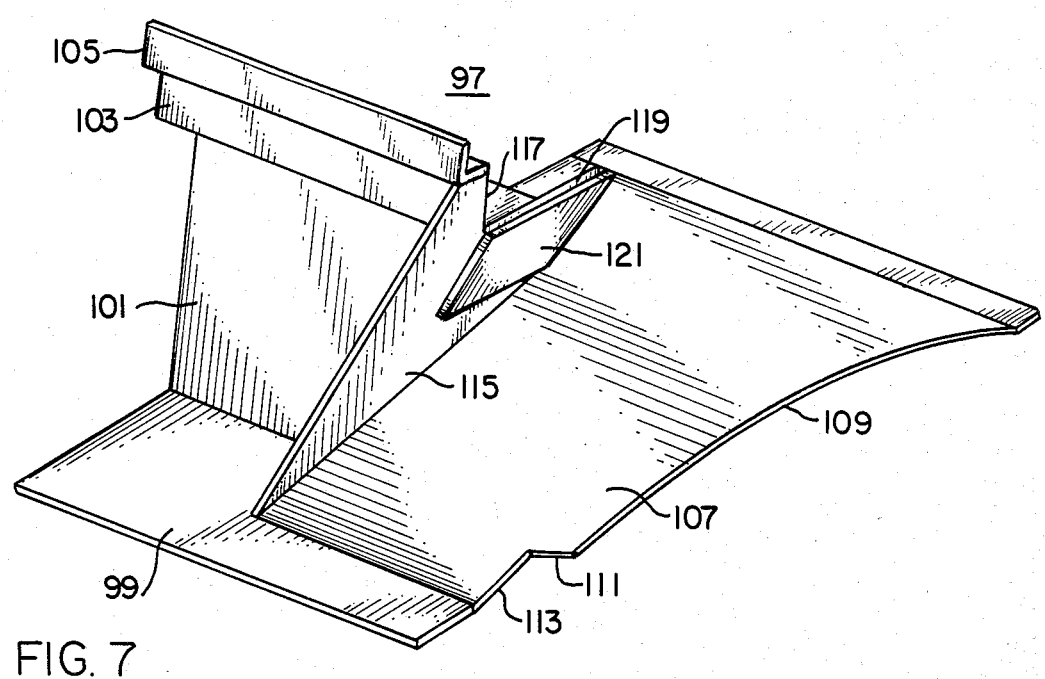
FIG. 7 is an isometric view of a scraper seal in accordance with the teachings of the invention.

A second seal unit 97 is provided where the endless belt leaves the end pulley. This seal unit, which is shown in FIG. 7, also includes a flange portion 99 which abuts a flange 71 on the frame I beam. Similarly, a planar member 101, recessed from the longitudinal edge of the endless belt, extends at right angles from the flange portion 99 toward the resilient rail member and terminates in a first offset portion 103 which accommodates the rail member and a second offset portion 105 which parallels the inner surface of the endless belt and extends around the longitudinal edge of the belt to form therewith a labyrinth seal.

This second seal unit 97 also serves as a scraper for removing any material that may have gotten past the seals and lodged in the grooves in the end pulleys, or adhered to the inner surface of the endless belt or the resilient rail member. Hence, this seal unit includes a planar member 107 which extends inward and laterally outward from the inner surface of the endless belt and intersects the flange portion 99. The leading edge of this planar member 107 is contoured with a first portion 109 which scrapes the bottom of the groove 29 in the end pulley, a second portion 11 which scrapes the side of the groove 29 and a third portion 113 which scrapes the peripheral surface of the end pulley outside the groove 29. A second planar member 115 which abuts the trailing edge of the first planar member 107 extends inward from the inner surface of the endless belt and trails longitudinally in the direction of belt movement. This second planar member which extends perpendicular to the plane of the loop of the endless belt, intersects the planar member 101 and its first and second offset portion 103 and 105 respectively, and is provided with a notch 117 through which the resilient rail member passes. The bottom edge 119 of this notch is provided with a resilient scraper 121 which cleans the bottom surface of the resilient rail member.

The seal units 69 and 97 are provided for the end pulley at the digging end of the conveyor. They may also be provided, as shown in FIG. 1, at the discharge end, again with seal unit 69 used where the belt approaches the pulley and the unit 97 where it leaves the pulley. Between these end seal units are seal members 123 having flanges 125 which abut the flanges 71 on I beams 73 and planar members which extend outward from the flange with first and second offset portions which accommodate the resilient rail members and the edge of the endless belt respectively to form therewith a labyrinth seal which is a continuation of the labyrinth seals formed by the seal units 69 and 97.

While in the digger illustrated, two wire ropes are coupled to the endless belt, one or any number of such wire ropes, each coupled to the endless belt by a resilient rail member made up of two rows of discrete blocks can be used as required to neutralize the lateral forces generated by the particular application.

The digger disclosed is light weight and can be advanced with a lateral component into a bulk material pile or storage chamber because the unique arrangement which couples the belt to the wire ropes as the belt passes around the end pulleys overcomes the forces tending to cause the belt to creep along the pulleys. For these reasons, it is particularly suitable as a digger head on the end of the elongated boom of a reclaimer. Longer versions of the digger are also useful as replacements for the conventional chain type bucket ladders in such installations as continuous ship unloaders and drag flight conveyors.

While the invention has been described in detail as applied to a conveyor with buckets, it is also applicable to conveyors having other types of digging elements which would contribute to the development of lateral forces on the endless belt, such as cleats. Such other digging elements could be discrete devices bolted to the belt in a similar manner to the buckets or could be formed integrally with the belt. One such other application of the invention is to the cleated tracks used in the tethered vehicle for moving bulk material described and claimed in my above-identified copending application.

What is claimed is:

1. A belt conveyor comprising:
   an endless belt having digging means protruding from the outer surface thereof at spaced locations along its length;
   a frame including a pair of spaced pulleys around which said endless belt rotates;
   an endless wire rope extending throughout its length inside the loop of said endless belt;
   a resilient rail member secured to the inner surface of said endless belt and having a longitudinal bore therethrough in which is loosely received the wire rope throughout its length, the side edges of said rail member being tapered inward toward each other from the endless belt inward, and said pulleys having peripheral grooves therein having a cross-section, including tapered side walls, corresponding to, but slightly smaller in width than, that of said resilient rail member for receiving the same so that as said endless belt, resilient rail member and endless wire rope pass around said pulleys together, said resilient rail member is wedged down into the pulley groove to tightly grip said wire rope which, in turn, resists any forces tending to cause the belt to creep axially along the pulleys and resists digging forces generated by the digging means which tend to cause the belt to pull radially away from the pulleys.

2. The conveyor of claim 1 wherein said resilient rail member comprises two longitudinal halves having elongated grooves in the confronting faces thereof which engage between them said endless wire rope, and wherein the width of said grooves in said end pulleys is less than the combined width of the two longitudinal halves of said resilient rail member such that said longitudinal halves are wedged toward each other by the weding action between the tapered side walls of said grooves and the tapered edges of said longitudinal halves to generate a gripping force by the longitudinal halves on said endless wire rope as the endless belt, endless wire ropes and longitudinal halves pass around the end pulleys.

3. The conveyor of claim 2 wherein each of said longitudinal halves of said resilient rail member comprise a series of discrete blocks and wherein the width of the grooves in said end pulleys is less than the combined width of said discrete blocks in the two longitudinal halves of said resilient rail member such that the discrete blocks in each series are wedged toward the adjacent discrete blocks in the other series by the wedging action of the tapered side walls of said grooves and the tapered side edges of the discrete blocks to generate a gripping force by the discrete blocks on said endless wire rope as the endless belt, wire rope and discrete blocks pass around the pulleys.

4. The conveyor of claim 3 wherein adjacent of said discrete blocks in each series thereof have longitudinal, meshing fingers.

5. The conveyor of claim 3 wherein said digging means comprises discrete digging members and wherein said discrete blocks and discrete digging members are secured to the inner and outer surfaces respectively of said endless belt by elongated fasteners passing through the discrete blocks, the belt and said discrete digging members.

6. The conveyor of claim 5 wherein the discrete digging members are cleats.

7. The conveyor of claim 5 wherein the discrete digging members are buckets.

8. The conveyor of claim 7 wherein said buckets are secured to the outer surface of the endless belt at the leading and trailing ends thereof at longitudinally spaced points along the belt and include means for accommodating for the change in the straight line distance between said spaced points as the endless belt and buckets pass around the pulleys.

9. The conveyor of claim 8 wherein said accomodating means includes bucket mounting means including first mounting means at one of said longitudinally spaced points which allows the end of said bucket mounted thereby to reciprocate relative to said point in the plane of the loop formed by the endless belt.

10. The conveyor of claim 9 wherein the bottom wall of each bucket is formed by said endless belt.

11. The conveyor of claim 10 wherein said accommodating means includes side walls of said buckets extending along the endless belt having bottom edges facing the belt which are concavely curved to accommodate the curvature of the peripheral surface of the pulleys.

12. The conveyor of claim 9 wherein said first mounting means connects the trailing end of said bucket to the endless belt and includes a linkage pivotally connected to the bucket and to a fixed pivot on the endless belt at one of said spaced points for rotation in the plane of the loop formed by said endless belt and wherein the leading end of the bucket is pivotally connected to the belt at the other spaced point by a fixed pivot of second mounting means.

13. The conveyor of claim 12 including a second endless wire rope and two additional series of discrete blocks loosely securing said second endless wire rope to the inner surface of said endless belt throughout its length in transversely spaced relation across the belt from the first wire rope, said additional discrete blocks having tapered side edges and said pulleys having additional peripheral grooves which receive said tapered blocks, and additional first and second bucket mounting means secured to the endless belt by additional elongated fasteners passing through the mounting means, the endless belt and discrete blocks in said additional series of discrete blocks.

14. Tthe conveyor of claim 1 including a plurality of endless wire ropes inside the loop of the endless belt and a plurality of resilient rail members each with tapered side edges and a longitudinal bore in which a wire rope is received throughout its length secured to the inner surface of said endless belt with said wire ropes spaced at intervals across the inner surface of the endless belt, said end pulleys having peripheral grooves therein having a cross-section corresponding to, but slightly narrower than, that of each of said resilient rail members such that as the endless belt, endless wire ropes and resilient rail members pass around the end pulleys, each of the rail members is wedged against and tightly grips the associated wire rope.

15. The conveyor of claim 14 wherein said resilient rail members each comprise two rows of discrete blocks of resilient material having longitudinal grooves in confronting faces which receive the associated wire rope.

16. The conveyor of claim 15 wherein said digging means are discrete digging members on the outside of said endless belt at spaced intervals therealong and including a plurality of elongated fasteners for each discrete digging member each of which is connected to said digging member, passes through the endless belt aand is secured to a discrete block in one of said rows thereof.

17. The conveyor of claim 14 wherein said digging members are buckets and including means for pivotally connecting the buckets to said elongated fasteners at one end of the buckets and pivotally mounted linkages connecting the bucket to said elongated fasteners at the other end thereof such that, said other end of the bucket can move in the direction of the longitudinal axis of the belt relative to the elongated fasteners to which it is connected by the pivotally mounted linkage to accommodate for the change in the straight line distance between the elongated fasteners connected to the two ends of the buckets as they pass around the end pulleys.

18. The conveyor of claim 13 wherein said plurality of wire ropes includes at least a wire rope secured to said endless belt by a resilient rail member with tapered side edges adjacent each longitudinal edge of the endless belt and wherein said frame includes an elongated longitudinal member extending along each side of the conveyor outside of the endless belt and overlapping said end pulleys which are journalled for rotation at opposite ends of said elongated longitudinal members, and seal means including means filling the spaces bounded by said elongated longitudinal members, the lateral edges of the endless belt and the end pulleys, said means including at least one end pulley means which overlap the ends of the pulley between the elongated longitudinal members and the edges of the portion of the belt which is approaching said one end pulley as the endless belt rotates, and scraper means extending into the grooves in said one pulley at the point where the resilient rail members leave the grooves for scraping deposits from the grooves and diverting them laterally out of the plane of the endless belt.

19. The conveyor of claim 18 wherein said scraper comprises a first planar member extending inward and laterally outward from the inner surface of the endless belt with a leading edge contoured to scrape the groove and the face of the one pulley between the groove and the end of the pulley and a second planar member abutting the trailing edge of said first planar member and extending inward from the inner surface of the endless belt and longitudinally in the direction of belt movement with a notch in the edge toward the inner surface of the belt contoured to scrape the surface of said resilient rail member as it passes therethrough.

20. The conveyor of claim 19 wherein said space filling means of said seal means includes third planar members recessed from the side edges of said endless belt and extending from the elongated longitudinal members to the resilient rail members at right angles thereto and which then extend laterally outward and around the resilient rail members and the inner surface and longitudinal edges of the endless belt to form a labyrinth seal to keep material and foreign matter from getting under the belt and resilient rail members.

21. The conveyor of claim 20 wherein the seal means includes curved plate members abutting the ends of said third planar members where the latter approach said one end pulley, said curved plate members extending laterally outward to the ends of said one pulley and circumferentially around said pulley in close proximity thereto to cover the grooves therein between the elongated longitudinal member and the endless belt where it begins to wrap around the pulley and with said overlapping means extending from the curved plate members around the ends of said one end pulley.

* * * * *